United States Patent
Lu et al.

(10) Patent No.: US 10,521,042 B2
(45) Date of Patent: Dec. 31, 2019

(54) TOUCH DISPLAY PANEL AND METHOD FOR DRIVING THE TOUCH DISPLAY PANEL AND DEVICE FOR DRIVING THE TOUCH DISPLAY PANEL

(71) Applicant: BOE TECHNOLOGY GROUP CO., LTD., Beijing (CN)

(72) Inventors: Jianing Lu, Beijing (CN); Yuanbo Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 78 days.

(21) Appl. No.: 15/308,385

(22) PCT Filed: Nov. 30, 2015

(86) PCT No.: PCT/CN2015/096029
§ 371 (c)(1),
(2) Date: Nov. 2, 2016

(87) PCT Pub. No.: WO2016/086823
PCT Pub. Date: Jun. 9, 2016

(65) Prior Publication Data
US 2017/0052637 A1 Feb. 23, 2017

(30) Foreign Application Priority Data
Dec. 5, 2014 (CN) .......................... 2014 1 0737782

(51) Int. Cl.
*G06F 3/044* (2006.01)
*G06F 3/041* (2006.01)

(52) U.S. Cl.
CPC .......... *G06F 3/0416* (2013.01); *G06F 3/0412* (2013.01)

(58) Field of Classification Search
CPC .......................................... G09G 2330/041–12
See application file for complete search history.

(56) References Cited

U.S. PATENT DOCUMENTS

| 5,825,345 A | 10/1998 | Takahama et al. |
| 2008/0309628 A1 | 12/2008 | Krah et al. |

(Continued)

FOREIGN PATENT DOCUMENTS

| CN | 102402330 A | 4/2012 |
| CN | 102929460 A | 2/2013 |

(Continued)

OTHER PUBLICATIONS

Chinese First Office Action for Chinese Application No. 201410737782.7, dated Dec. 22, 2016, 12 Pages.

(Continued)

*Primary Examiner* — Sanghyuk Park
(74) *Attorney, Agent, or Firm* — Brooks Kushman P.C.

(57) ABSTRACT

The present disclosure relates to a touch display panel, a method and a device for driving the touch display panel. The method is applied to the touch display panel which includes L gate lines arranged sequentially and M touch scan lines arranged sequentially, where both L and M are positive integers larger than 1. The method includes dividing a duration for which the touch display panel displays each frame of image into N control time intervals with each of the N control time intervals including a display refresh time and a touch time arranged sequentially, where N is an integer larger than 1, during the duration for which the touch display panel displays each frame of image, driving the L gate lines sequentially in N display refresh times, and driving the M touch scan lines sequentially for K times in N touch times, where K is larger than 1.

13 Claims, 4 Drawing Sheets

(56) References Cited

U.S. PATENT DOCUMENTS

| | | | |
|---|---|---|---|
| 2010/0295824 A1 | 11/2010 | Noguchi et al. | |
| 2012/0050217 A1* | 3/2012 | Noguchi | G06F 3/0412 345/174 |
| 2012/0056835 A1 | 3/2012 | Choo et al. | |
| 2012/0056870 A1* | 3/2012 | Koh | G09G 3/20 345/215 |
| 2012/0256861 A1* | 10/2012 | Park | G06F 3/044 345/173 |
| 2013/0194229 A1 | 8/2013 | Sabo et al. | |
| 2014/0111467 A1 | 4/2014 | Chen et al. | |
| 2014/0292678 A1 | 10/2014 | Hayashi et al. | |
| 2014/0306906 A1 | 10/2014 | Huang et al. | |
| 2014/0354590 A1 | 12/2014 | Wang et al. | |
| 2015/0002462 A1 | 1/2015 | Zhao et al. | |

FOREIGN PATENT DOCUMENTS

| | | |
|---|---|---|
| CN | 103207720 A | 7/2013 |
| CN | 104020916 A | 9/2014 |
| CN | 104090696 A | 10/2014 |
| CN | 104461138 A | 3/2015 |
| CN | 104503610 A | 4/2015 |

OTHER PUBLICATIONS

International Search Report and Written Opinion for Application No. PCT/CN2015/096029, dated Mar. 2, 2016, 13 Pages.
Search Report for European Application No. EP15865787, dated May 25, 2018, 8 pages.
CN104090696A, English Abstract and Translation.
Second Office Action for European Application No. 15865787.4, dated Sep. 27, 2019, 6 pages.

\* cited by examiner

TOUCH DISPLAY PANEL AND METHOD FOR DRIVING THE TOUCH DISPLAY PANEL AND DEVICE FOR DRIVING THE TOUCH DISPLAY PANEL

CROSS-REFERENCE TO RELATED APPLICATIONS

This application is the U.S. national phase of PCT Application No. PCT/CN2015/096029 filed on Nov. 30, 2015, which claims priority to Chinese Patent Application No. 201410737782.7 filed on Dec. 5, 2014, the disclosures of which are incorporated in their entirety by reference herein.

TECHNICAL FIELD

The present disclosure relates to a technical field of touch display, and specifically relates to a touch display panel and a method and a device for driving the touch display panel.

BACKGROUND

In an in-cell type touch screen, in order to prevent a display operation and a touch operation from interfering with each other, a currently typical method is to drive the display operation and the touch operation in a time division manner during a duration for displaying a frame, and to make a scan frequency of the display operation and a scan frequency of the scan operation to be the same, or to make the scan frequency of the touch operation to be twice of that of the display operation. As shown in FIG. 1, TSVD is a frame synchronization signal for a touch scan operation, and TSHD is a horizontal synchronization signal for the touch scan operation. In the related art, when both the TSVD and the TSHD are at a low level, a display scan operation is performed; when the TSVD is at the low level and the TSHD is at a high level, the touch scan operation is performed; when the TSVD is at the high level and the TSHD is at the low level, the display scan operation is performed; and when both the TSVD and the TSHD is at the high level, neither the display scan operation nor the touch scan operation is performed, but display data signal noise, power supply interference noise, and/or thermal noise are captured as noise pulses which are loaded to a transmitting terminal of a touch sensor. A receiving terminal of the touch sensor receives feedback signals and sends them to a processor for processing, and a period TTSVD of the TSVD is equal to the duration for displaying a frame. In such a case, the scan frequency of the display operation and the scan frequency of the touch operation are the same. In FIG. 1, Display is a display data signal, TX1 is a first touch scan line, TX2 is a second touch scan line, TXM is an M-th touch scan line, and the in-cell type touch screen (display panel) includes M touch scan lines, where M is a positive integer larger than 2.

Because the duration for displaying one frame is relatively constant, the time for driving a screen to display is required to be long enough, and the time for the display operation becomes longer and longer with a resolution being increased, the time for the touch operation becomes shorter and shorter. However, as peoples require a touch response speed to be faster and faster, a higher touch driving frequency is needed (more touch time is needed).

SUMMARY

One main purpose of the present disclosure is to provide a touch display panel and a method and a device for driving the touch display panel, which can improve a touch driving frequency as well as a touch response speed.

To achieve the above purpose, the present disclosure provides a method for driving a touch display panel which includes L gate lines arranged sequentially and M touch scan lines arranged sequentially, where both L and M are positive integers larger than 1. The method includes:

dividing a duration for which the touch display panel displays each frame of image into N control time intervals with each of the N control time intervals including a display refresh time and a touch time arranged sequentially, where N is an integer larger than 1;

during the duration for which the touch display panel displays each frame of image, driving the L gate lines sequentially in N display refresh times, and driving the M touch scan lines sequentially for K times in N touch times, where K is larger than 1.

In implementation, N is an integer larger than M, and the L gate lines are divided into N gate line groups according to arrangement orders of the L gate lines.

During the duration for which the touch display panel displays each frame of image, one of the gate line groups is driven in each display refresh time, and one of the touch scan lines is driven in each touch time.

In implementation, in different control time intervals, a time span of each display refresh time is equal and a time span of each touch time is also equal.

In implementation, a first noise pulse capture time interval is set between every two adjacent durations each for displaying one frame of image, and display data signal noise, power supply interference noise and/or thermal noise are captured as noise pulses in the first noise pulse capture time interval.

In implementation, a second noise pulse capture time interval is set after the driving to the M touch scan lines is completed during the duration for displaying each frame of image, and in the second noise pulse capture time interval, the display data signal noise, the power supply interference noise and/or the thermal noise are captured as the noise pulses.

In implementation, the method further includes:

when the display refresh time of a previous frame is completed, scanning a P-th touch scan line, where P is a positive integer smaller than or equal to M;

when P is smaller than M, starting a driving operation from a (P+1)-th touch scan line when the display refresh time of a next frame is started; and when P is equal to M, starting a driving operation from a first touch scan line when the display refresh time of the next frame is started.

In implementation, the touch display panel is an in-cell type touch display panel.

The present disclosure further provides a device for driving a touch display panel which includes L gate lines arranged sequentially and M touch scan lines arranged sequentially, where both L and M are positive integers larger than 1. The device includes:

a clock unit configured to divide a duration for which the touch display panel displays each frame of image into N control time intervals with each of the control time intervals including a display refresh time and a touch time arranged sequentially, where N is an integer larger than 1;

a display control unit configured to, during the duration for which the touch display panel displays each frame of image, drive the L gate lines sequentially in N display refresh times; and a touch control unit configured to, during the duration for which the touch display panel displays each frame of image, drive the M touch scan lines sequentially for K times in N touch times, where K is larger than 1.

In implementation, N is an integer larger than M, and the L gate lines are divided into N gate line groups according to arrangement orders of the L gate lines.

The display control unit is specifically configured to, during the duration for which the touch display panel displays each frame of image, drive one of the gate line groups in each of the display refresh times.

The touch control unit is specifically configured to, during the duration for which the touch display panel displays each frame of image, drive one of the touch scan lines in each of the touch times.

In implementation, in different control time intervals, a time span of each display refresh time is equal and a time span of each touch time is also equal.

In implementation, the device further includes a noise pulse capture unit.

The clock unit is further configured to set a first noise pulse capture time interval between every two adjacent durations each for displaying one frame of image.

The noise pulse capture unit is configured to capture display data signal noise, power supply interference noise and/or thermal noise as noise pulses in the first noise pulse capture time interval.

In implementation, the clock unit is further configured to set a second noise pulse capture time interval after driving to the M touch scan lines is completed, during the duration for displaying each frame of image.

The noise pulse capture unit is further configured to capture the display data signal noise, the power supply interference noise and/or the thermal noise as the noise pulses in the second noise pulse capture time interval.

In implementation, the touch control unit is further configured to, when the display refresh time of a previous frame is completed, scan a P-th touch scan line, where P is a positive integer smaller than or equal to M.

When P is smaller than M, the touch control unit is further configured to start a driving operation from a (P+1)-th touch scan line when the display refresh time of a next frame is started.

When P is equal to M, the touch control unit is further configured to start a driving operation from a first touch scan line when the display refresh time of the next frame is started.

In implementation, the touch display panel is an in-cell type touch display panel.

The present disclosure further provides a touch display panel, including the above device.

Comparing with the related arts, the touch display panel, the method and the device for driving the touch display panel according to the present disclosure, divide the duration for which the touch display panel displays each frame of image into N control time intervals with each of the control time intervals including a display refresh time and a touch time arranged sequentially. That is, the duration for displaying one frame is divided into N sections, and in the sections in which the touch display panel displays each frame of image, the L gate lines are driven sequentially in the N display refresh times, and the M touch scan lines are sequentially driven for K times in the N touch times, where K is larger than 1. That is, in the duration for displaying one frame, touch driving signals of more than one frame are fed back to external touch driving chips, thereby increasing the touch driving frequency.

DETAILED DESCRIPTION

Technical solutions of the embodiments of the present disclosure will be described clearly and briefly hereinafter in combination of the drawings of the embodiments of the present disclosure. Obviously, the described embodiments are only a part, but not all, of the embodiments of the present disclosure. All other embodiments obtained by one skilled in the art without paying any creative labor based on the embodiments of the present disclosure fall into the scope of the present disclosure.

Figure 6:
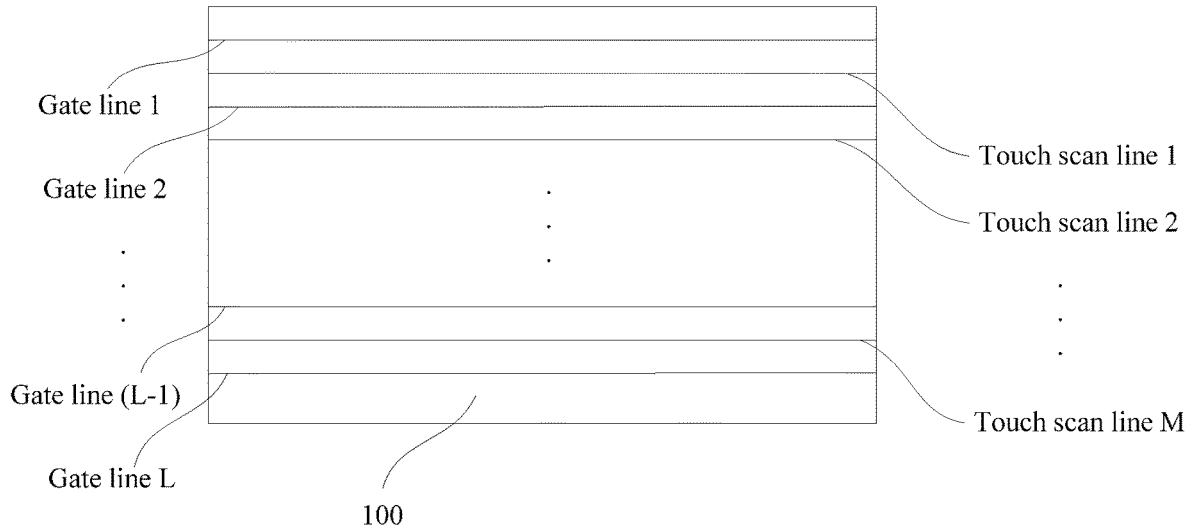
FIG. 6 is a schematic diagram of a touch display panel according to some embodiments of the present disclosure.

The embodiments of the present disclosure provide a method for driving a touch display panel. As shown in FIG. 6, the touch display panel 100 includes L gate lines arranged sequentially and M touch scan lines arranged sequentially, where both L and M are positive integers larger than 1. It should be noted that, FIG. 6 is one of the embodiments of the present disclosure, in which one of the touch scan lines is arranged between every two gate lines; in other embodiments of the present disclosure, one of the touch scan lines may be arranged corresponding to multiple gate lines, i.e., several of the gate lines may be arranged between every two touch lines.

Figure 1:
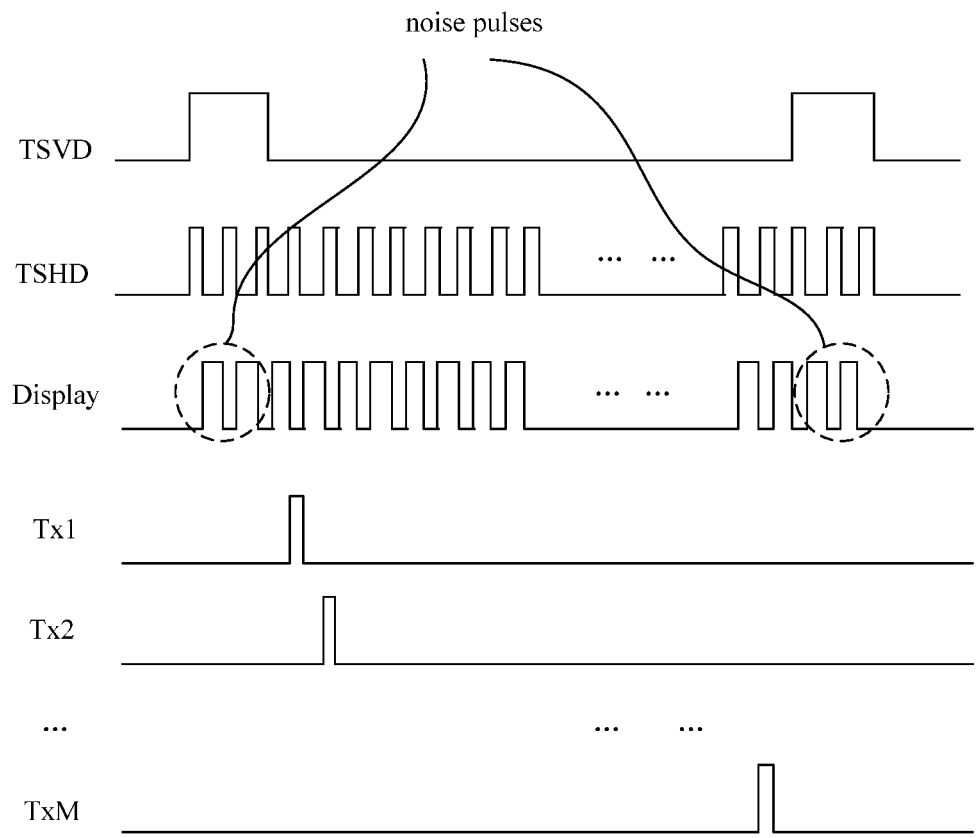
FIG. 1 is a timing diagram of a method for driving an in-cell type touch display panel in the related art.
Figure 2:
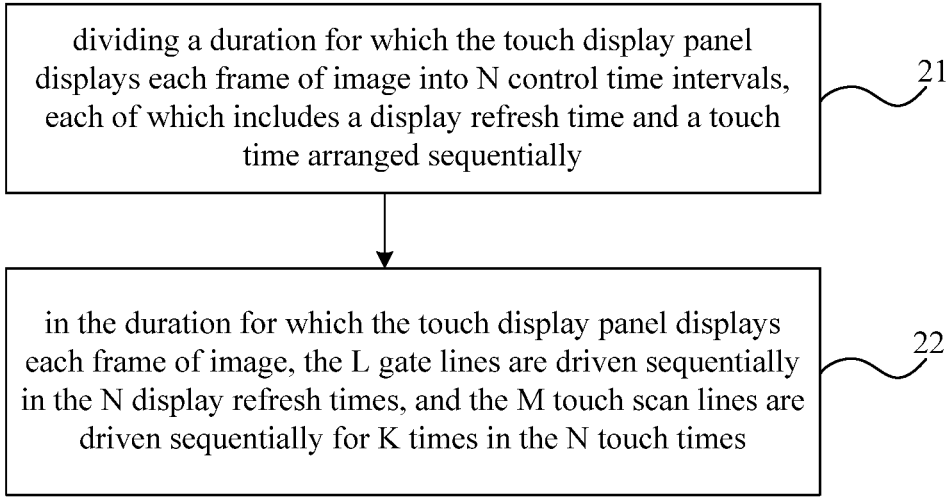
FIG. 2 is a flowchart of a method for driving a touch display panel according to some embodiments of the present disclosure.

As shown in FIG. 2, the method includes: Step 21: dividing a duration for which the touch display panel displays each frame of image into N control time intervals, each of which includes a display refresh time and a touch time arranged sequentially, where N is an integer larger than 1; Step 22: in the duration for which the touch display panel displays each frame of image, sequentially driving the L gate lines in the N display refresh times, and sequentially driving the M touch scan lines for K times in the N touch times, where K is larger than 1.

In one aspect, the method for driving the touch display panel according to the embodiments of the present disclosure divides the duration for which the touch display panel displays each frame of image into the N control time intervals, each of which includes the display refresh time and the touch time arranged sequentially, i.e., the duration for displaying one frame is divided into N time intervals and an idle interval in which the display driving operation is not performed is used to perform the touch driving operation. An advantage of such method is that touch driving signals can be transmitted to external touch driving chips by means of sectioned scans, thus increasing a touch response speed dramatically.

In another aspect, the method for driving the touch display panel according to the embodiments of the present disclosure, in the duration for which the touch display panel displays each frame of image, drives the L gate lines sequentially in the N display refresh times, and drives the M touch scan lines sequentially for K times in the N touch times, where K is larger than 1. That is, in the duration for displaying one frame, touch driving signals of more than one frame are fed back to the external touch driving chips, thereby increasing a touch driving frequency.

In a specific example of the method for driving the touch display panel, N is an integer larger than M, and the L gate lines are divided into N gate line groups according to their orders.

In the duration for which the touch display panel displays each frame of image, one of the gate line groups is driven in each display refresh time, and one of the touch scan lines is driven in each touch time.

In the specific example of the method for driving the touch display panel, the L gate lines are needed to be driven in the duration for displaying one frame, and the L gate lines are divided into N sections, where N is a positive integer; and the number M of the touch scan lines is smaller than N, and the touch scan lines are driven in the idle interval of the display driving operation, i.e., the touch time is divided into N+1 sections or N−1 sections.

In the specific example of the method for driving the touch display panel, the touch driving operation is performed in the idle interval of the display driving operation, and the touch driving frequency is higher than the display driving frequency; after driving to the M-th touch scan line is completed, the driving to the first touch scan line is started again, until the duration for displaying one frame ends. At the beginning of the duration for displaying a second frame, the driving starts from one of the touch scan lines of the previous frame, other than always from the first touch scan line as done in the related art. For example, when the duration for displaying the previous frame ends, a P-th touch scan line is driven, where P is a positive integer smaller or equal to M. If P is smaller than M, then when the duration for displaying the next frame is started, it starts to drive the (P+1)-th touch scan line; and if P is equal to M, then when the duration for displaying the next frame is started, it starts to drive the first touch scan line. By arranging such sequence of the touch scan operation, touch driving signals of more than one frame have been fed back to the external touch driving chips, such that the touch driving frequency is increased, and the touch scan operations for two adjacent frames may be continued across frames, thereby preventing the driving to the touch scan lines from being interrupted for the reason that the number of the touch scan lines driven in the duration for displaying one frame is not a multiple of the total number of the touch scan lines.

In summary, the specific example of the method for driving the touch display panel of the embodiments of the present disclosure increases the touch driving frequency and improves a touch response speed.

Optionally, in different control time intervals, a time span of each display refresh time is equal, and a time span of each touch time is also equal, so that controls to the display driving operations and the touch driving operations are implemented.

Figure 3:
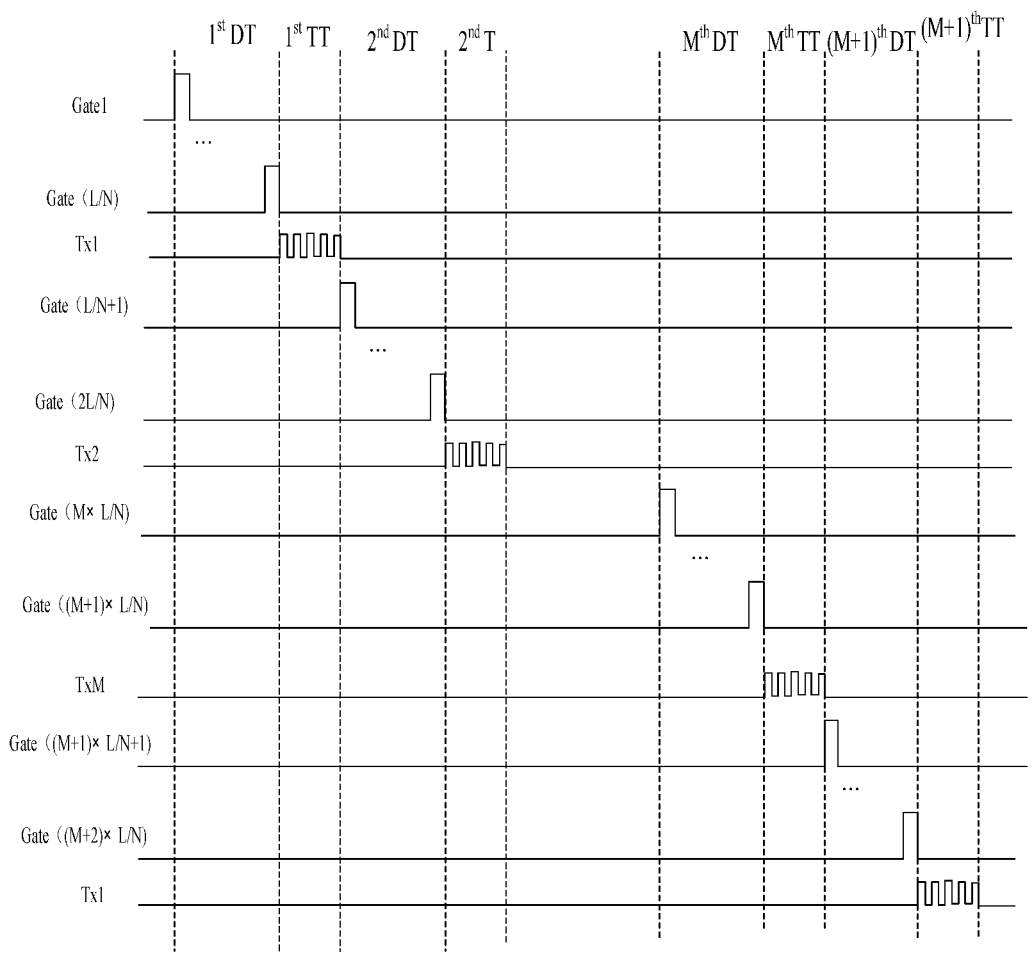
FIG. 3 is a timing diagram of display driving signals and touch driving signals in a specific example of the method for driving the touch display panel according to some embodiments of the present disclosure.

FIG. 3 is a timing diagram of display driving signals and touch driving signals in accordance with the specific example of the method for driving the touch display panel of the embodiments of the present disclosure.

As shown in FIG. 3, in the specific example of the method for driving the touch display panel according to the embodiment of the present disclosure, L may be a multiple of N, and in a first display refresh time ($1^{st}$ DT), a first gate line Gate 1 to a (L/N)-th gate line Gate are driven sequentially, and in a first touch time ($1^{st}$ TT), a first touch scan line Tx1 is driven; in a second display refresh time ($2^{nd}$ DT), a (L/N+1)-th gate line Gate to a (2L/N)-th gate line Gate are driven sequentially, and in a second touch time ($2^{nd}$ TT), a second touch scan line Tx2 is driven; and so on; and in an M-th display refresh time ($M^{th}$-DT), a (M×L/N)-th gate line Gate to a ((M+1)×L/N)-th gate line Gate are driven sequentially, and in an M-th touch time ($M^{th}$ TT), an M-th touch scan line is driven. Till this time, the duration for displaying one frame is not over, but the driving to the M touch scan lines has been completed. Then, in a (M+1)-th display refresh time (($M+1)^{th}$ DT), a ((M+1)×L/N+1)-th gate line Gate to a (M+2)× L/N)-th gate line Gate are driven sequentially, and in a (M+1)-th touch time (($M+1)^{th}$ TT), the first touch scan line Tx1 is driven again; and so on.

In the specific example of the method for driving the touch display panel according to the embodiments of the present disclosure, after the driving to the M touch scan lines is completed, the driving to all of the gate lines is not completed, i.e., in the duration for displaying one frame, touch driving signals for more than one frame have been fed back to the external touch display chips, thus improving the touch driving frequency.

Specifically, the specific example of the method for driving the touch display panel according to the embodiments of the present disclosure arranges a first noise pulse capture time interval between every two adjacent durations for display one frame. In the first noise pulse capture time interval, noise signals such as display data signal noise, power supply interference noise and/or thermal noise, are captured as noise pulses.

Specifically, the method for driving the touch display panel according to the embodiments of the present disclosure arranges a second noise pulse capture time interval in each duration for displaying one frame after the driving to the M touch scan lines is completed. In the second noise pulse capture time interval, the noise signals such as the display data signal noise, the power supply interference noise and/or the thermal noise, are captured as the noise pulses.

Figure 4:
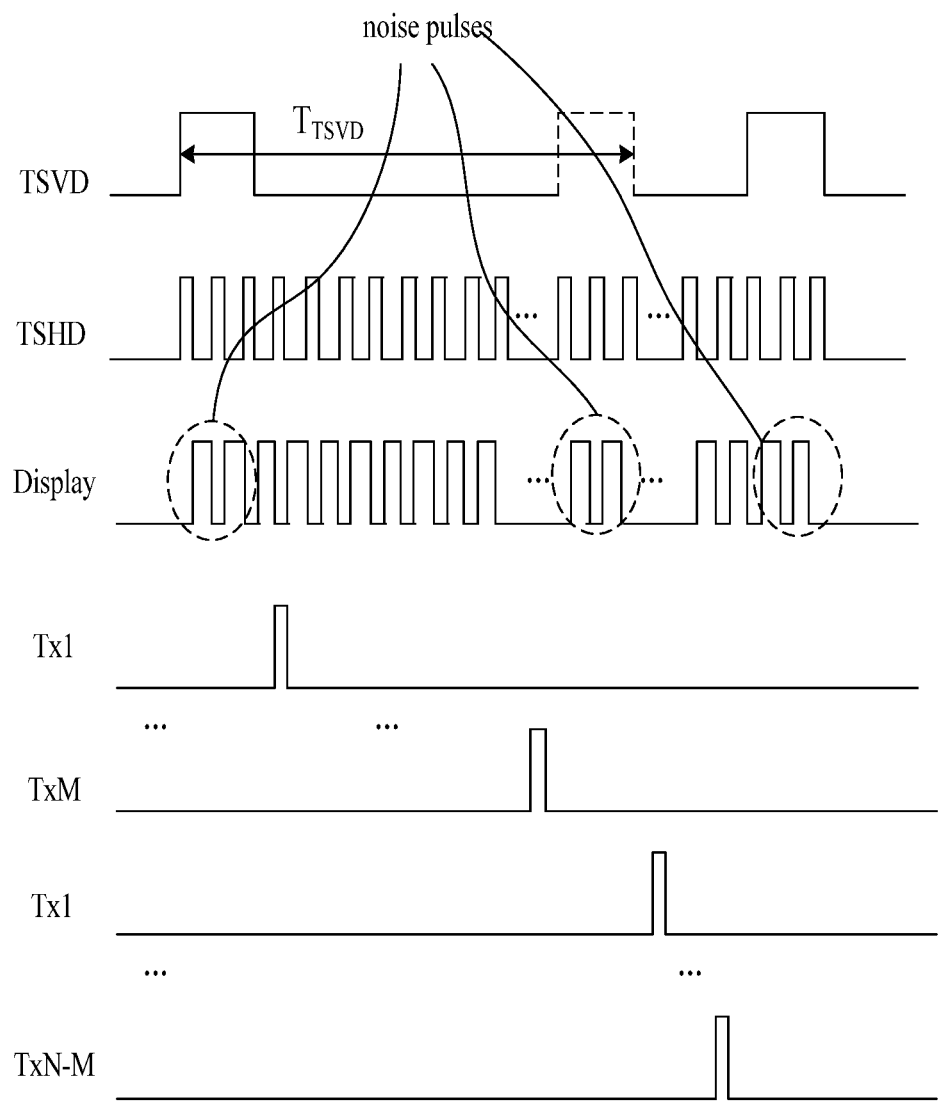
FIG. 4 is a timing diagram of another specific example of the method for driving the touch display panel according to some embodiments of the present disclosure.

In actual operation, as shown in FIG. 4, the method for driving the touch display panel of the embodiments of the present disclosure, controls the frame synchronization signal TSHD of the touch scan operation and the horizontal synchronization signal TSVD of the touch scan operation asynchronously, and implements any touch frequency arrangement by adjusting $T_{TSVD}$ and waveforms of TSVD and TSHD as well as using a mode in which touch scan signals are driven sequentially and in non-integer times in the duration for displaying one frame.

It is assumed that the touch display panel includes L gate lines and M touch scan lines, the duration for which the touch display panel displays each frame of image is divided into N control time intervals, each of the N control time intervals includes the display refresh time and the touch time arranged sequentially, where L, M, and N are integers larger than 1, N is larger than M and N is smaller than 2M.

In the $T_{TSVD}$, when both the TSVD and the TSHD are at the high level, i.e., in a set time interval for capturing the noise pulses, the display driving operation or the touch driving operation is not performed, but the noise signals such as the display data signal noise, the power supply interference noise and/or the thermal noise are captured as the noise pulses; when the TSVD is at the high level and the TSHD is at the low level, the display driving operation is performed normally.

In the $T_{TSVD}$, when the TSVD is at the low level and the TSHD is at the high level, the M touch scan lines are driven sequentially in the touch time; when both the TSVD and the TSHD are at the low level, the M×(L/N) gate lines are driven sequentially in the display refresh time. As shown in FIG. 4, when the driving to the M touch scan lines is completed, scanning to the L gate lines is not completed, and thus the touch scan frequency is larger than the display scan frequency, thereby improving the touch response speed.

After the driving to the M touch scan lines is completed, the second noise pulse capture time interval is set, and in the second noise pulse capture time interval, both the TSVD and the TSHD are set to the high level, and the noise signals such as the display data signal noise, the power supply interference noise and/or the thermal noise are captured as the noise pulses; and when the TSVD is at the high level and the TSHD is at the low level, the display driving operation is performed normally.

In FIG. 4, TX1 is the first touch scan line, TXM is the M-th touch scan line, and the TXN−M is the (N−M)-th touch scan line.

In the method for driving the touch display panel according to the embodiments of the present disclosure, the number of noise pulses is increased, and thus more noise pulses are captured, and a signal to noise ratio is further increased by integrated circuit (IC) internal algorithms for a processor.

The present disclosure further provides a device for driving a touch display panel. The touch display panel includes L gate lines arranged sequentially and M touch scan lines arranged sequentially, and both L and M are positive integers larger than 1.

Figure 5:
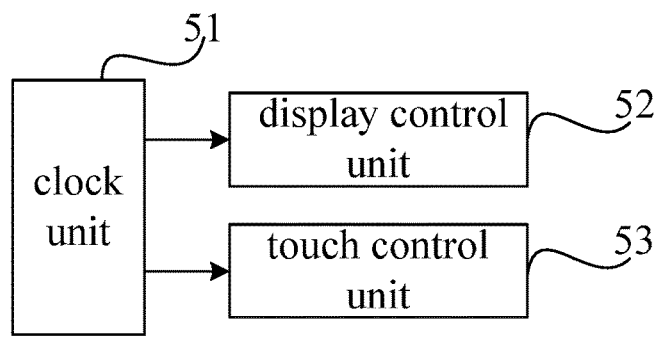
FIG. 5 is a block diagram of a device for driving a touch display panel according to some embodiments of the present disclosure.

As shown in FIG. 5, the device includes: a clock unit 51 configured to divide a duration for which the touch display panel displays one frame of image into N control time intervals, each of which includes a display refresh time and a touch time arranged sequentially, where N is an integer larger than 1; a display control unit 52 configured to drive the L gate lines sequentially in the N display refresh times during the duration for which the touch display panel displays each frame of image; and a display control unit 53 configured to drive the M touch scan lines sequentially for K times in the N touch times during the duration for which the touch display panel displays each frame of image, where K is larger than 1.

According to a specific example, N is an integer larger than M, and the L gate lines are divided into N gate line groups according to their orders.

The display control unit is specifically configured to drive one of the gate line groups in each of the display refresh times during the duration for which the touch display panel displays each frame of image.

The touch control unit is specifically configured to drive one of the touch scan lines in each of the touch times during the duration for which the touch display panel displays each frame of image.

Optionally, in different control time intervals, a time span of each display refresh time is equal, and a time span of each touch time is also equal.

Specifically, the device for driving the touch display panel further includes a noise pulse capture unit and a processor.

The clock unit is further to arrange a first noise pulse capture time interval between every two adjacent durations for display one frame of image.

The noise pulse capture unit is configured to capture noise signals such as display data signal noise, power supply interference noise and/or thermal noise as the noise pulses in the first noise pulse capture time interval.

Specifically, the clock unit is further configured to, in the duration for displaying each frame of image, arrange a second noise pulse capture time interval after the driving to the M touch scan lines is completed.

The noise pulse capture unit is further configured to capture the noise signals such as the display data signal noise, the power supply interference noise and/or the thermal noise as the noise pulses in the second noise pulse capture time interval.

Optionally, the touch control unit is further configured to, when the display refresh time of the previous frame is completed, scan the P-th touch scan line, where P is a positive integer smaller than or equal to M.

When P is smaller than M, the touch control unit is further configured to, when the display refresh time of the next frame is started, start a driving operation from the (P+1)-th touch scan line.

When P is equal to M, the touch control unit is further configured to, when the display refresh time of the next frame is started, start a driving operation from the first touch scan line.

In actual operation, because the in-cell touch panel has a high requirement for that the display operation and the touch operation would not interfere with each other, the method and the device of the present disclosure may be applied into the in-cell type touch panel.

The touch display panel provided in the embodiments of the present disclosure includes the above device for driving the touch display panel.

The touch display device provided in the embodiments of the present disclosure includes the above touch display panel.

The above are only optional embodiments of the present disclosure. It should be pointed out that numerous modifications and embellishments may be done by one skilled in the art without departing the spirit of the present disclosure. Such modifications and embellishments should also be considered to be within the protection scope of the present disclosure.

What is claimed is:

1. A method for driving a touch display panel which comprises L gate lines arranged sequentially and M touch scan lines arranged sequentially, where both L and M are positive integers larger than 1, the method comprising:

dividing a duration for which the touch display panel displays each frame of image into N control time intervals with each of the N control time intervals comprising a display refresh time and a touch time arranged sequentially, where N is an integer larger than 1;

during the duration for which the touch display panel displays each frame of image, driving the L gate lines sequentially in N display refresh times, and driving the M touch scan lines sequentially for K times in N touch times, where K is larger than 1;

wherein N is an integer larger than M, and the L gate lines are divided into N gate line groups according to arrangement orders of the L gate lines;

during the duration for which the touch display panel displays each frame of image, one of the gate line groups is driven in each display refresh time, and one of the touch scan lines is driven in each touch time;

when the display refresh time of a previous frame is completed, scanning a P-th touch scan line, where P is a positive integer smaller than or equal to M;

when P is smaller than M, starting a driving operation from a (P+1)-th touch scan line when the display refresh time of a next frame is started; and when P is equal to M, starting a driving operation from a first touch scan line when the display refresh time of the next frame is started;

wherein a quantity of the touch scan lines driven in the duration for which the touch display panel displays each frame of image is not a multiple of M.

2. The method according to claim 1, wherein, in different control time intervals, a time span of each display refresh time is equal and a time span of each touch time is also equal.

3. The method according to claim 1, further comprising:
setting a first noise pulse capture time interval between every two adjacent durations each for displaying one frame of image; and capturing display data signal noise, power supply interference noise and/or thermal noise as noise pulses in the first noise pulse capture time interval.

4. The method according to claim 3, further comprising:
setting a second noise pulse capture time interval after driving to the M touch scan lines is completed during the duration for displaying each frame of image; and capturing the display data signal noise, the power supply interference noise and/or the thermal noise as the noise pulses in the second noise pulse capture time interval.

5. The method according to claim 1, wherein the touch display panel is an in-cell type touch display panel.

6. The method according to claim 1, wherein L is a multiple of N, and N is smaller than 2M.

7. A device for driving a touch display panel which comprises L gate lines arranged sequentially and M touch scan lines arranged sequentially, where both L and M are positive integers larger than 1, the device comprising:

a clock unit configured to divide a duration for which the touch display panel displays each frame of image into N control time intervals with each of the control time intervals comprising a display refresh time and a touch time arranged sequentially, where N is an integer larger than 1;

a display control unit configured to, during the duration for which the touch display panel displays each frame of image, drive the L gate lines sequentially in N display refresh times; and a touch control unit configured to, during the duration for which the touch display panel displays each frame of image, drive the M touch scan lines sequentially for K times in N touch times, where K is larger than 1;

wherein N is an integer larger than M, and the L gate lines are divided into N gate line groups according to arrangement orders of the L gate lines;

the display control unit is specifically configured to, during the duration for which the touch display panel displays each frame of image, drive one of the gate line groups in each of the display refresh times; and the touch control unit is specifically configured to, during the duration for which the touch display panel displays each frame of image, drive one of the touch scan lines in each of the touch times;

wherein the touch control unit is further configured to, when the display refresh time of a previous frame is completed, scan a P-th touch scan line, where P is a positive integer smaller than or equal to M;

when P is smaller than M, the touch control unit is further configured to start a driving operation from a (P+1)-th touch scan line when the display refresh time of a next frame is started; and when P is equal to M, the touch control unit is further configured to start a driving operation from a first touch scan line when the display refresh time of the next frame is started;

wherein a quantity of the touch scan lines driven in the duration for which the touch display panel displays each frame of image is not a multiple of M.

8. The device according to claim 7, wherein, in different control time intervals, a time span of each display refresh time is equal and a time span of each touch time is also equal.

9. The device according to claim 7, wherein the touch display panel is an in-cell type touch display panel.

10. The device according to claim 7, wherein L is a multiple of N, and N is smaller than 2M.

11. A touch display panel, comprising:
L gate lines arranged sequentially, where L is a positive integer larger than 1;

M touch scan lines arranged sequentially, where M is a positive integer larger than 1; and a device for driving the touch display panel, wherein the device comprises:

a clock unit configured to divide a duration for which the touch display panel displays each frame of image into N control time intervals with each of the control time intervals comprising a display refresh time and a touch time arranged sequentially, where N is an integer larger than 1;

a display control unit configured to, during the duration for which the touch display panel displays each frame of image, drive the L gate lines sequentially in N display refresh times; and a touch control unit configured to, during the duration for which the touch display panel displays each frame of image, drive the M touch scan lines sequentially for K times in N touch times, where K is larger than 1;

wherein N is an integer larger than M, and the L gate lines are divided into N gate line groups according to arrangement orders of the L gate lines;

the display control unit is specifically configured to, during the duration for which the touch display panel displays each frame of image, drive one of the gate line groups in each of the display refresh times; and the touch control unit is specifically configured to, during the duration for which the touch display panel displays each frame of image, drive one of the touch scan lines in each of the touch times;

the touch control unit is further configured to, when the display refresh time of a previous frame is completed, scan a P-th touch scan line, where P is a positive integer smaller than or equal to M;

when P is smaller than M, the touch control unit is further configured to start a driving operation from a (P+1)-th touch scan line when the display refresh time of a next frame is started; and when P is equal to M, the touch control unit is further configured to start a driving operation from a first touch scan line when the display refresh time of the next frame is started;

wherein a quantity of the touch scan lines driven in the duration for which the touch display panel displays each frame of image, is not a multiple of M.

12. The touch display panel according to claim 11, wherein, in different control time intervals, a time span of each display refresh time is equal and a time span of each touch time is also equal.

13. The touch display panel according to claim 11, wherein L is a multiple of N, and N is smaller than 2M.

* * * * *